Sept. 22, 1953     L. R. HEIM     2,653,064
BALL BEARING
Filed Dec. 28, 1951
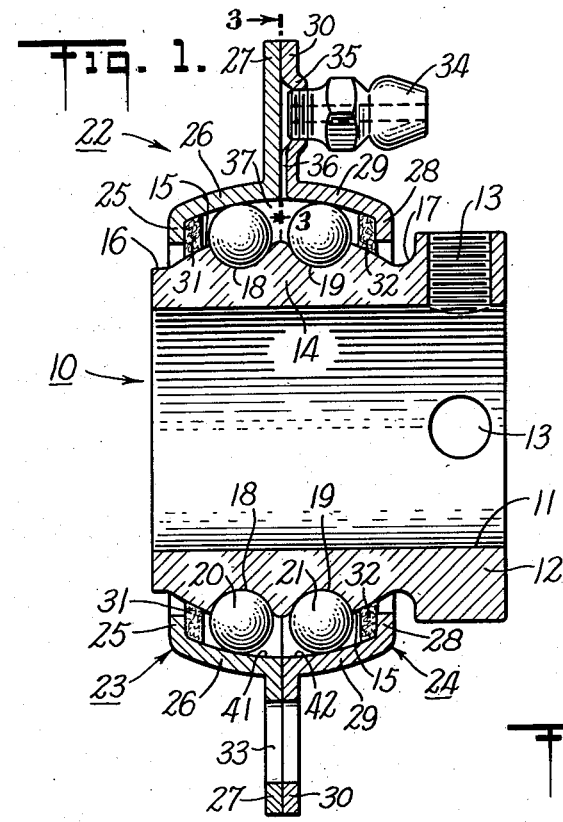
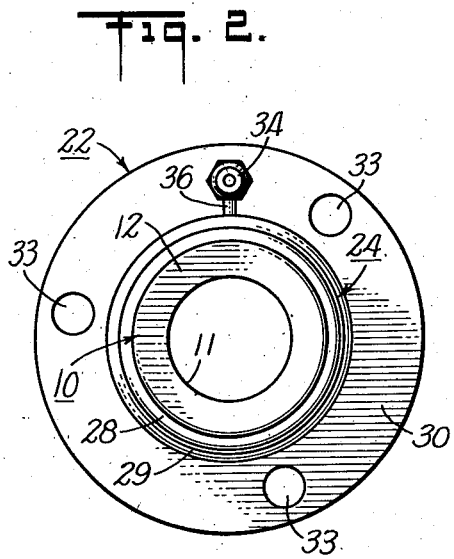
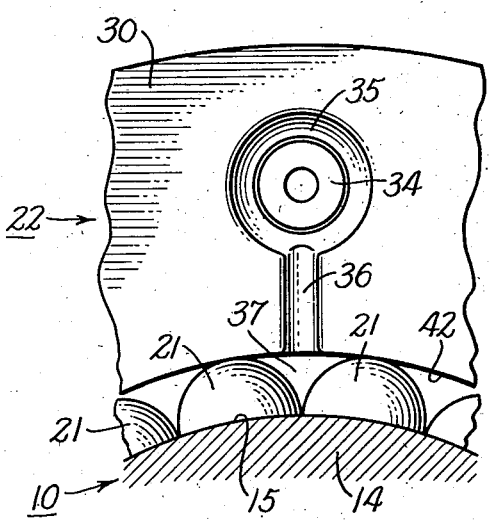
INVENTOR
Lewis R. Heim Patented Sept. 22, 1953

2,653,064

UNITED STATES PATENT OFFICE 2,653,064

BALL BEARING

Lewis R. Heim, Fairfield, Conn., assignor to The Heim Company, Fairfield, Conn., a corporation of Connecticut Application December 28, 1951, Serial No. 263,911

3 Claims. (Cl. 308—187)

This invention relates to improvements in bearings, and more particularly to a bearing adapted to accommodate misalignment of relatively rotating parts secured respectively to the inner and outer races of the bearing.

In various types of mechanisms, for example, vehicles that are driven or hauled over rough terrain, accommodation must be made for terrain inequalities to avoid undue strain being put on axles, bearings and other parts of the vehicle. In general, wheel and axle bearings capable of accommodating such strains are well known, but nevertheless have deficiencies that limit their usefulness; it accordingly is among the objects of my invention to provide a bearing of the above nature which obviates such deficiencies.

It is a further object of this invention to provide a bearing of the above-mentioned nature which is inexpensive and easy to produce under mass production requisites, and which is thoroughly simple and well able to withstand extended rigorous use. Other objects will be in part apparent and in part pointed out hereinafter.

In the drawing, wherein I have shown one embodiment of my invention,

Figure 1 is a sectional elevation of my bearing;

Figure 2 is a reduced side elevation of the bearing as viewed from the right in Figure 1; and, Figure 3 is an enlarged fragmentary section taken along the line 3—3 of Figure 1.

Similar reference characters refer to similar parts throughout the views of the drawing.

In accordance with one form of my invention, the bearing includes an inner race, which may conveniently be a machined part, having an interior bore for the reception of a shaft or axle or the like. The exterior of the inner race is spherical in form and has a pair of peripheral grooves formed therein which provide tracks for two sets of ball bearings. The outer race of my bearing comprises a pair of shells preferably drawn from sheet metal, and so formed as to provide a central radially extending flange which may be secured to the web of a wheel, for example. The inner bearing surface of the shells, comprising the outer race, is spherical, is generated from the same axis as the spherical surface of the inner race member, and is so dimensioned that the two sets of ball bearings track thereagainst. Thus, limited universal movement may occur between the inner and outer races. Additionally, the outer race has opposed inwardly extending flanges within which are disposed annular seals which not only preclude admission of foreign particles to the bearing surfaces, but also preclude escape of lubricant which is conveniently supplied to the bearing by a fitting carried in the outer race flange.

More particularly, and with reference to Figure 1, the bearing comprises an inner race, generally indicated at 10, having a bore 11 for the reception of an axle or shaft (not shown). At one end of inner race 10 is a hub portion 12 drilled and threaded as at 13 for the reception of set screws (not shown) by which the bearing may be secured to its shaft. The body portion 14 of inner race 10 includes an outer spherical surface 15 descending to a flat or land 16, at the left side of the bearing, as viewed in Figure 1, and to the base 17 of hub 12 at the right-hand side of the bearing. A pair of annular grooves 18 and 19 are provided in the body 14 of inner race 10, and these grooves are of sufficient depth to receive respectively a substantial portion of each of a series or group of bearing balls 20 and 21, the grooves accordingly providing bearing tracks for their respective sets of balls which accordingly have substantial thrust and radial bearing capacity. The grooves accordingly provide tracking surfaces for the sets of balls about the axis of the inner race, but effectively and positively preclude relative movement of the balls axially of inner race 10. Indeed, to assure adequate thrust capacity, the depth of each groove may approximate the radius of a bearing ball. Furthermore, by virtue of the provision of grooves 18 and 19, the need for expensive and difficult means to assemble ball cages or retaining and spacing rings is obviated, as the grooves efficiently and effectively space the two sets of balls and also accommodate a full complement of balls in each set, thus increasing the load capacity of the bearing. Preferably, but not necessarily, the diameter of hub 12 is substantially the same as that of the spherical body portion 14 of inner race 10, for a purpose that will be described hereinafter.

The outer race of my bearing is generally indicated at 22, and comprises a pair of stamped sheet metal shells, in turn generally indicated at 23 and 24. While these shells may be formed in any suitable manner, I preferably deep draw them from sheet metal, as each may be formed from the same die set. Accordingly, shell 23 includes an inwardly extending flange 25, a bearing or tracking portion 26, and a radially outwardly extending flange 27; shell 24 similarly includes an inwardly extending flange 28, a bearing or tracking portion 29, and a radially outwardly extending flange 30. Portions 26 and 29 of shells 23 and 24 are so formed as to have inner spherical surfaces 31 and 32 which together form a spherical bearing surface for bearing balls 20 and 21, having the same axis of generation as that of spherical surface 15 of inner race 10. Thus the opposed spherical surfaces of inner race 10 and outer race 22 are concentric, accordingly permitting free relative movement between the inner and outer races of the bearing about their common axis, i. e. movement other than their normal relative rotational movement. Such movement is, however, limited and desirably so by the spacing between shell flange 28 and the inner portion of hub 12. Of course, the relative rocking movement between the inner and outer races may be varied within reasonable limits, as desired, by the proportioning of one part relative to another.

In order to exclude, or rather preclude the entrance of foreign particles within the bearing and also to preclude escape of lubricant, I preferably provide a pair of annular sealing washers 31 and 32, within outer race 22 and adjacent the respective inwardly directed flanges 25 and 28. These sealing washers may be made of any suitable material and are so dimensioned as to fit snugly within the space between the inner and outer races, thus to have good sealing contact with each.

As hereinbefore noted, shells 23 and 24 include radially outwardly extending flanges 27 and 30. Upon assembly of the bearing, these flanges may be secured together in any suitable manner as, for example, and in many cases preferably, by welding. The two flanges, in any event, constitute a relatively heavy rigid unitary structure well adapted to support a vehicle wheel or similar part which may be secured to the bearing by bolts or rivets that may extend through suitable holes 33 (Figure 2) extending through the flanges. Thus it follows that such vehicle wheel or other part is securely fastened to the bearing and may accordingly not only rotate but also rock relative to inner race 10, as hereinbefore described with reference to outer race 22.

Bearings such as herein contemplated must, of course be provided with adequate means of lubrication, and to this end I have provided a lubricant fitting 34, which is illustratively threaded into a threaded boss 35, preferably outstruck from flange 30 of shell 29. As shown in Figure 3, a lubricant channel 36 is formed in any suitable manner in the interior side of flange 30, thus communicating the inner side of boss 35 with the space 37 between inner and outer races 22 and 10. Thus, lubricant introduced through fitting 34 may flow through boss 35 and groove 36 into space 37, to provide lubricant for the two sets of bearing balls tracked between the inner and outer races.

It may now be seen that outer race 22 is freely rotatable about inner race 10 and is borne by bearing balls 20 and 21. At the same time the outer race is capable of limited rocking movement about the axis of inner race 10, or rather the axis of spherical surface 15 thereof so that any wheel or other part fastened to the outer race may partake of similar movement. By virtue of the depth of grooves 18 and 19 relative to the diameter of balls 20 and 21, the bearing has very adequate thrust capacity. Thus the bearing is well adapted to accommodate misalignment between the relatively rotating parts secured to the bearing.

Accordingly the objects of my invention are fulfilled in a thoroughly efficient manner.

I claim:

1. In bearing construction, in combination, an inner race member having a plurality of ball receiving grooves formed in the outer surface thereof, an outer race member having a spherical inner bearing surface, said outer race member comprising a pair of stamped sheet metal shells each including an outwardly extending portion, said portions being secured together to form a flange at the equator line of said outer race member, each of said shells having an inwardly extending flange at its outer side, an annular sealing washer disposed between said inner and outer races adjacent each of said inwardly directed flanges and in engagement with the outer surface of said inner race member, and a plurality of bearing balls in said groove and tracking therein and against said spherical inner bearing surface of said outer race member.

2. In bearing construction, in combination, an inner race member having a plurality of ball receiving grooves formed in the outer surface thereof, said race member including an outer spherical surface, an outer race member having a spherical inner bearing surface concentric with said outer spherical surface, said outer race member comprising a pair of stamped sheet metal shells each including an inwardly extending flange portion at the side thereof, a plurality of bearing balls in said grooves and tracking therein and against said spherical inner bearing surface of said outer race member, and an annular sealing member disposed between said race members adjacent each of said flanges.

3. In bearing construction, in combination, an inner race member having a plurality of ball receiving grooves formed in the outer surface thereof, said race member including an outer spherical surface, an outer race member having a spherical inner bearing surface concentric with said outer spherical surface, said outer race member comprising a pair of stamped sheet metal shells each including an inwardly extending flange portion at the side thereof, a plurality of bearing balls in said grooves and tracking therein and against said spherical inner bearing surface of said outer race member, and an annular sealing member disposed between said race members adjacent each of said flanges, and means forming a lubrication channel to the space between said race members.

LEWIS R. HEIM.

References Cited in the file of this patent

UNITED STATES PATENTS

| Number | Name | Date |
|---|---|---|
| 1,957,002 | Searles | May 1, 1934 |
| 2,083,688 | Clements | June 15, 1937 |
| 2,298,463 | Burt | Oct. 13, 1942 |